United States Patent
Kim et al.

(10) Patent No.: US 9,802,496 B2
(45) Date of Patent: Oct. 31, 2017

(54) CHARGING VEHICLE, CHARGING SYSTEM AND DRIVING METHOD OF CHARGING SYSTEM

(71) Applicant: Hyundai Motor Company, Seoul (KR)

(72) Inventors: Zeung Il Kim, Gyeonggi-Do (KR); Jae Yong Seong, Gyeonggi-Do (KR); Do Hoon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 291 days.

(21) Appl. No.: 14/561,338

(22) Filed: Dec. 5, 2014

(65) Prior Publication Data

US 2016/0075242 A1 Mar. 17, 2016

(30) Foreign Application Priority Data

Sep. 16, 2014 (KR) .................. 10-2014-0122905

(51) Int. Cl.
*B60L 11/18* (2006.01)

(52) U.S. Cl.
CPC ....... *B60L 11/1809* (2013.01); *B60L 11/1838* (2013.01); *B60L 11/1842* (2013.01); *B60L 2240/72* (2013.01); *Y02T 10/7005* (2013.01); *Y02T 10/7088* (2013.01); *Y02T 90/163* (2013.01); *Y02T 90/167* (2013.01); *Y02T 90/168* (2013.01)

(58) Field of Classification Search
CPC .............. B60L 2240/72; B60L 11/1838; B60L 11/1842; Y02T 90/163; Y02T 90/168; Y02T 90/167

USPC ......................................... 320/104, 107, 109
See application file for complete search history.

(56) References Cited

U.S. PATENT DOCUMENTS

| | | | | |
|---|---|---|---|---|
| 2014/0316939 A1* | 10/2014 | Uyeki | ................. | B60L 11/1844 705/26.9 |
| 2015/0015419 A1* | 1/2015 | Halker | ................ | B60L 11/1827 340/901 |
| 2015/0165915 A1* | 6/2015 | Cun | .................... | B60L 11/1809 320/101 |

FOREIGN PATENT DOCUMENTS

| | | |
|---|---|---|
| JP | 2013-130963 A | 7/2013 |
| KR | 10-2011-0107724 | 10/2011 |
| KR | 10-2013-0006949 | 1/2013 |
| KR | 10-2013-0052897 A | 5/2013 |
| KR | 10-2013-0088456 | 8/2013 |
| KR | 10-2014-0078623 A | 6/2014 |

\* cited by examiner

*Primary Examiner* — Stacy Whitmore
(74) *Attorney, Agent, or Firm* — Mintz Levin Cohn Ferris Glovsky and Popeo, P.C.; Peter F. Corless

(57) ABSTRACT

A charging system includes: first stations configured to determine whether to transmit charger detection signals based on a preset charging mode and a state of charge of a battery included in a vehicle; and second stations configured to receive the charger detection signals or to transmit beacon signals to the transmitter based on the state of charge of the battery.

20 Claims, 5 Drawing Sheets

CHARGING VEHICLE, CHARGING SYSTEM AND DRIVING METHOD OF CHARGING SYSTEM

CROSS REFERENCE TO RELATED APPLICATION

The present application claims the benefit of and priority to Korean Patent Application Number 10-2014-0122905 filed on Sep. 16, 2014, the entire contents of which are incorporated herein for all purposes by reference.

BACKGROUND

1. Technical Field

The present disclosure relates to a charging vehicle, a charging system, and a driving method of a charging system, and more particularly, to a charging vehicle, a charging system, and a driving method of a charging system capable of detecting an optimal access point of a vehicle charger among a plurality of wireless access points.

2. Description of the Related Art

Recently, development of technologies associated with plug-in hybrid vehicles and electric vehicles has rapidly increased. The driving force of such vehicles derives, at least in part, from electric energy. Techniques for charging electric energy include putting a wired plug connected to a charger into an outlet, as well as wirelessly charging electric energy.

In the case of wired charging, charging standards for each country are different, and multiple standards can be accepted as a national standard. Therefore, there is a need to find a charger for a vehicle that supports the standard of interest (e.g., in the case of normal speed charging, there are 5-pin and 7-pin types, and in the case of rapid speed charging, there are Chademo, SGS, DC Combo types). For wireless charging, work for an international standard is still on going. It is expected to co-exist with a lot of variations such as coil type, capacity, pad position etc. Currently, there are various methods for recognizing a charger proximate to a vehicle as the vehicle approaches the charger, where the recognized charger is arranged in a charging pad, for example. In order for charger to be recognized, there is a need to provide wireless communication between the vehicle and the charger so as to understand, for example, whether coil types included in the vehicle and the charger match each other, what the maximum output capacity of the charger is, whether the coil of the charger is located at a front, a middle, or a back, e.g., based on a parking position, what the charging type is, whether the charger is automatically arranged, whether the charger is in a currently available state, and the like.

The vehicle may access the plurality of access points using a variety of communication techniques, such as, for example, 3G, long term evolution (LTE), WiFi, or the like. However, the access points include the access point of the charger and an access point of a non-charger, and therefore, the vehicle must sort between the access points of the charger and the non-charger in order to approach the access point of the charger.

Conventionally, access to the charger of the vehicle is determined based on the strength of a received signal at a current position of the vehicle. Therefore, the vehicle has a problem in that it is difficult to determine whether the received signal is transmitted from an access point for simple data or is transmitted from the access point having the charger.

SUMMARY

An object of the present disclosure is to provide a charging vehicle, a charging system, and a driving method of a charging system capable of reaching an optimal access point which may charge a vehicle among a plurality of access points.

According to embodiments of the present disclosure, there is provided a charging system, including: first stations configured to determine whether to transmit charger detection signals based on a preset charging mode and a state of charge of a battery included in a vehicle; and second stations configured to receive the charger detection signals or to transmit beacon signals to the transmitter based on the state of charge of the battery.

When a preset charging mode is a first charging mode, or when the state of charge of the battery is lower than a preset reference value and the preset charging mode is a second charging mode, the first stations may transmit the charger detection signals to the second stations.

When the preset charging mode is a second charging mode and the state of charge of the battery is higher than the preset reference value, the first stations may receive any of the beacon signals transmitted from the second stations.

The first stations may select any of the beacon signals to be received based on a kind of the second stations.

A first station of the first stations may select a second station of the second stations that is transmitting the selected beacon signal in order to receive power from the selected second station.

The beacon signals may include charging information of each of the second stations.

The second stations may include charging stations and non-charging stations, and the charging stations of the second stations may transmit response signals to the first stations in response to the charger detection signals transmitted from the first stations.

The second stations may include charging stations and non-charging stations, and when there are no charging stations of the second stations receiving the charger detection signals transmitted from the first stations, the non-charging stations of the second stations may disregard the charger detection signals transmitted from the first stations or transmit the charger detection signals to other second stations within a signal arrival range of the non-charging stations.

The charging stations of the other second stations within the signal arrival range of the non-charging stations may transmit response signals to the non-charging stations in response to the charger detection signals transmitted from the non-charging stations.

The non-charging stations may transmit the response signals received from the charging stations of the other second stations within the signal arrival range of the non-charging stations to the first stations.

When there are no charging stations of the other second stations receiving the charger detection signals within the signal arrival range of the non-charging stations, the non-charging stations of the other second stations within the signal arrival range of the non-charging stations may transmit the charger detection signals to other second stations within a signal arrival range of non-charging stations of the other second stations within the signal arrival range of the non-charging stations or disregard the charger detection signals.

Furthermore, according to embodiments of the present disclosure, there is provided a charging vehicle, including: a controller configured to determine whether to transmit charger detection signals based on a preset charging mode and a state of charge of a battery included in a vehicle; a transmitter configured to transmit the charger detection signals to a plurality of access points based on the determination of whether to transmit the charger detection signals; and a receiver configured to receive beacon signals from the plurality of access points based on the determination of whether to transmit the charger detection signals.

When the preset charging mode is a first charging mode, or when the preset charging mode is a second charging mode and the state of charge of the battery is lower than a preset reference value, the controller may instruct the transmitter to transmit the charger detection signals to the plurality of access points.

When the preset charging mode is a second charging mode and the state of charge of the battery is higher than a preset reference value, the controller may instruct the transmitter to not transmit the charger detection signals and instruct the receiver to receive the beacon signals from the plurality of access points.

Furthermore, according to embodiments of the present disclosure, there is provided a driving method of a charging system, including: determining, by first stations, whether to transmit charger detection signals to second stations based on a preset charging mode and a state of charge of a battery included in a vehicle; and a receiving, by the second stations, the transmitted charger detection signals based on the determination of whether to transmit the charger detection signals, or transmitting, by the second stations, beacon signals to the transmitter.

In the determining of whether to transmit the charger detection signals, when the preset charging mode is a first charging mode, or when the state of charge of the battery is lower than a preset reference value and the preset charging mode is a second charging mode, the first stations may determine to transmit the charger detection signals to the second stations.

In the determining of whether to transmit the charger detection signals, when the preset charging mode is a second charging mode and the state of charge of the battery is higher than a preset reference value, and the first stations determine to not transmit the charger detection signals, the second stations may transmit beacon signals to the transmitter.

The driving method of a charging system may further include: selecting, by the first stations, any of the beacon signals to be received based on a kind of the second stations.

The driving method of a charging system may further include: transmitting, by the charging stations of the second stations, response signals to the first stations in response to the charger detection signals transmitted from the first stations, wherein the second stations include charging stations and non-charging stations.

The driving method of a charging system may further include: when there is no the charging station receiving the charger detection signal of the second stations, disregarding, by the non-charging station of the second stations, the charger detection signals received from the first stations or transmitting the charger detection signals to other second stations within a signal arrival range of the non-charging stations, wherein the second stations include charging stations and non-charging stations.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION OF THE EMBODIMENTS

Figure 1:
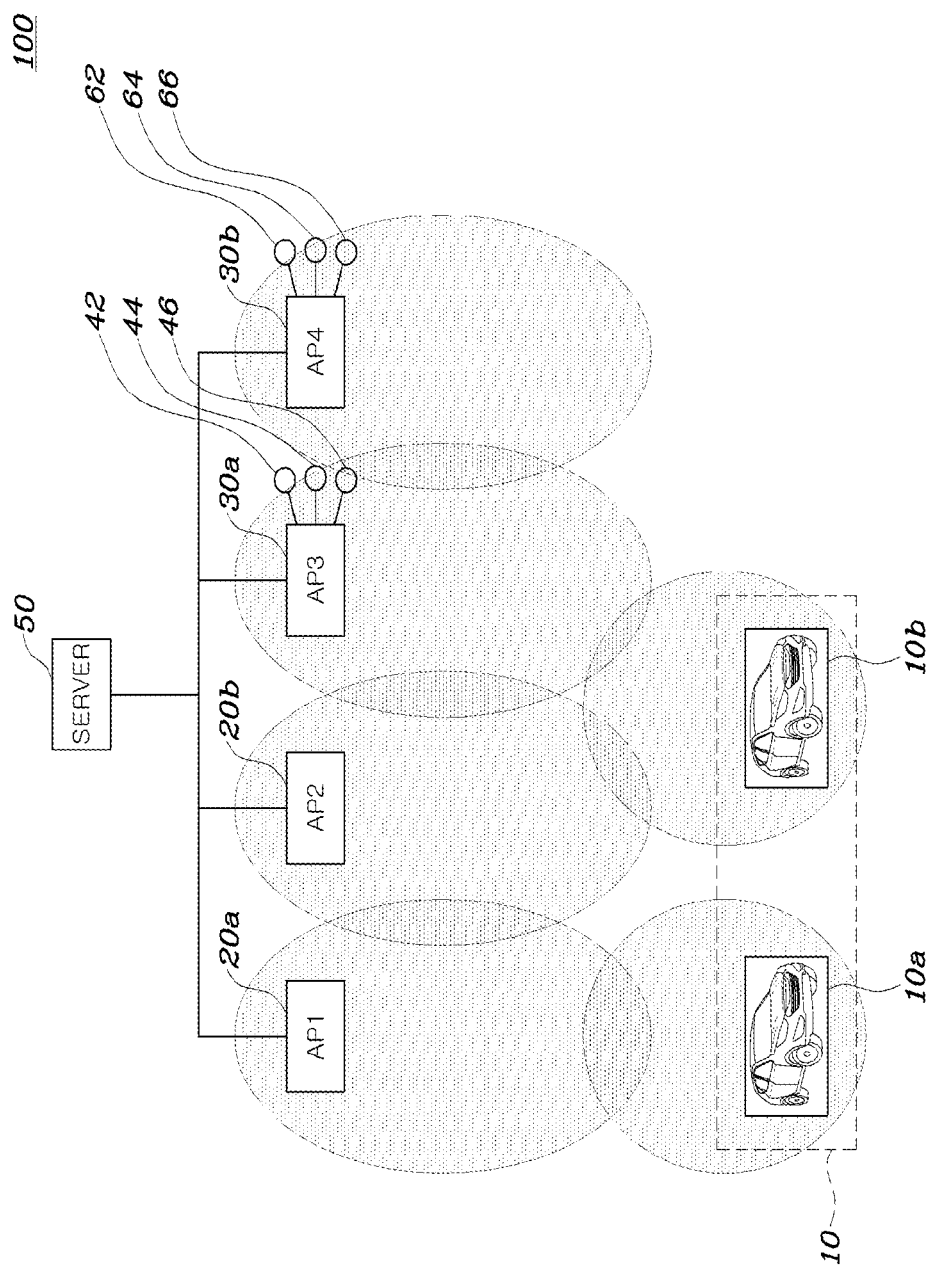
FIG. 1 is a diagram schematically illustrating a charging system according to embodiments of the present disclosure.

Specific structural and functional descriptions in embodiments of the present disclosure disclosed in the present specification are illustrated only to describe embodiments of the present disclosure. Therefore, the present disclosure may be practiced in various forms and should not be construed as limited to the embodiments disclosed in the present specification. The embodiments of the present disclosure may be modified and have various forms. Therefore, it is to be understood that the present disclosure is not limited to the embodiments, but includes all modifications, equivalents, and substitutions included in the spirit and the scope of the present disclosure.

Terms such as 'first', and/or 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present disclosure.

It is to be understood that when one component is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", or "neighboring to", "directly neighboring to" and the like, should be similarly interpreted.

Terms used in the present specification are used only in order to describe embodiments rather than limiting the present disclosure. Singular forms are intended to include plural forms unless the context clearly indicates otherwise. It will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for implementing a charging system.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless indicated otherwise, it is to be understood that all the terms used in the specification including technical and scientific terms have the same meaning as those that are understood by those skilled in the art. It must be understood that the terms defined by the dictionary are identical with the meanings within the context of the related art, and they should not be ideally or excessively formally defined unless the context clearly indicates otherwise.

Hereinafter, embodiments of the present disclosure will be described in detail with reference to the accompanying drawings. Like reference numerals proposed in each drawing denote like components.

Figure 4:
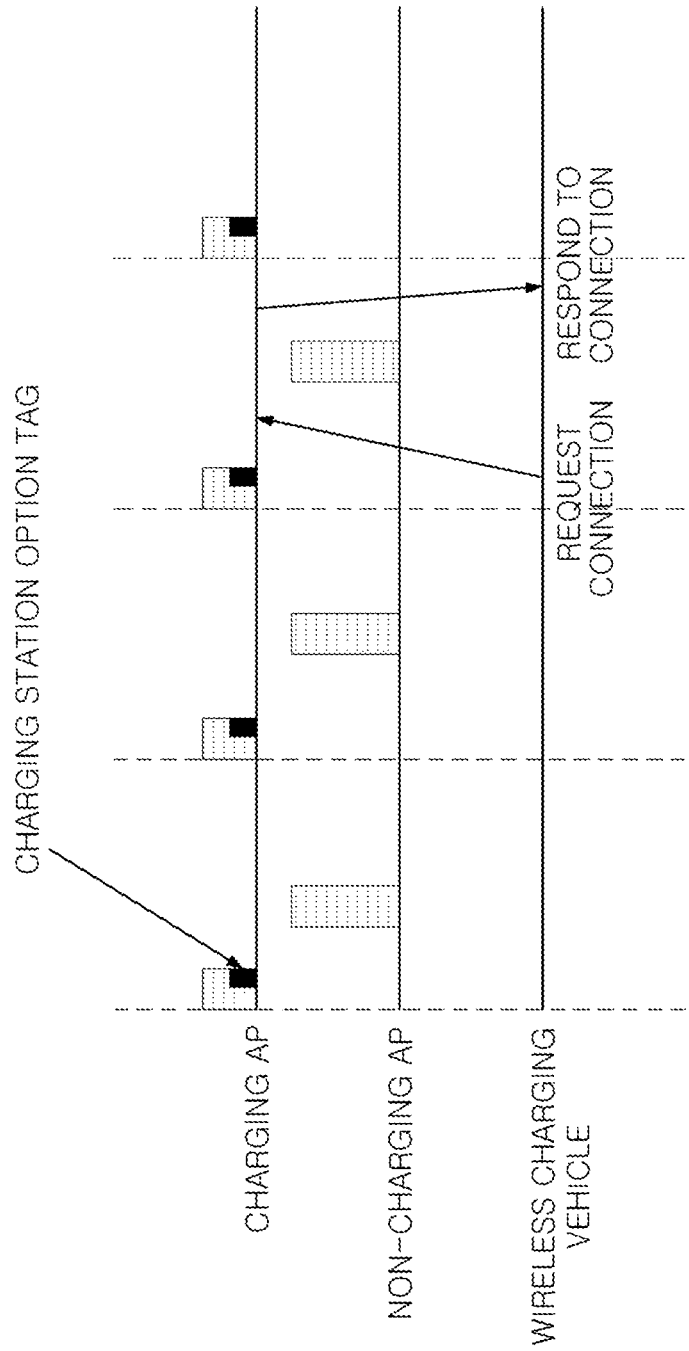
FIGS. 4 and 5 are diagrams illustrating an example of finding out a charging station between a non-charging station and the charging station and the vehicle.
Figure 5:
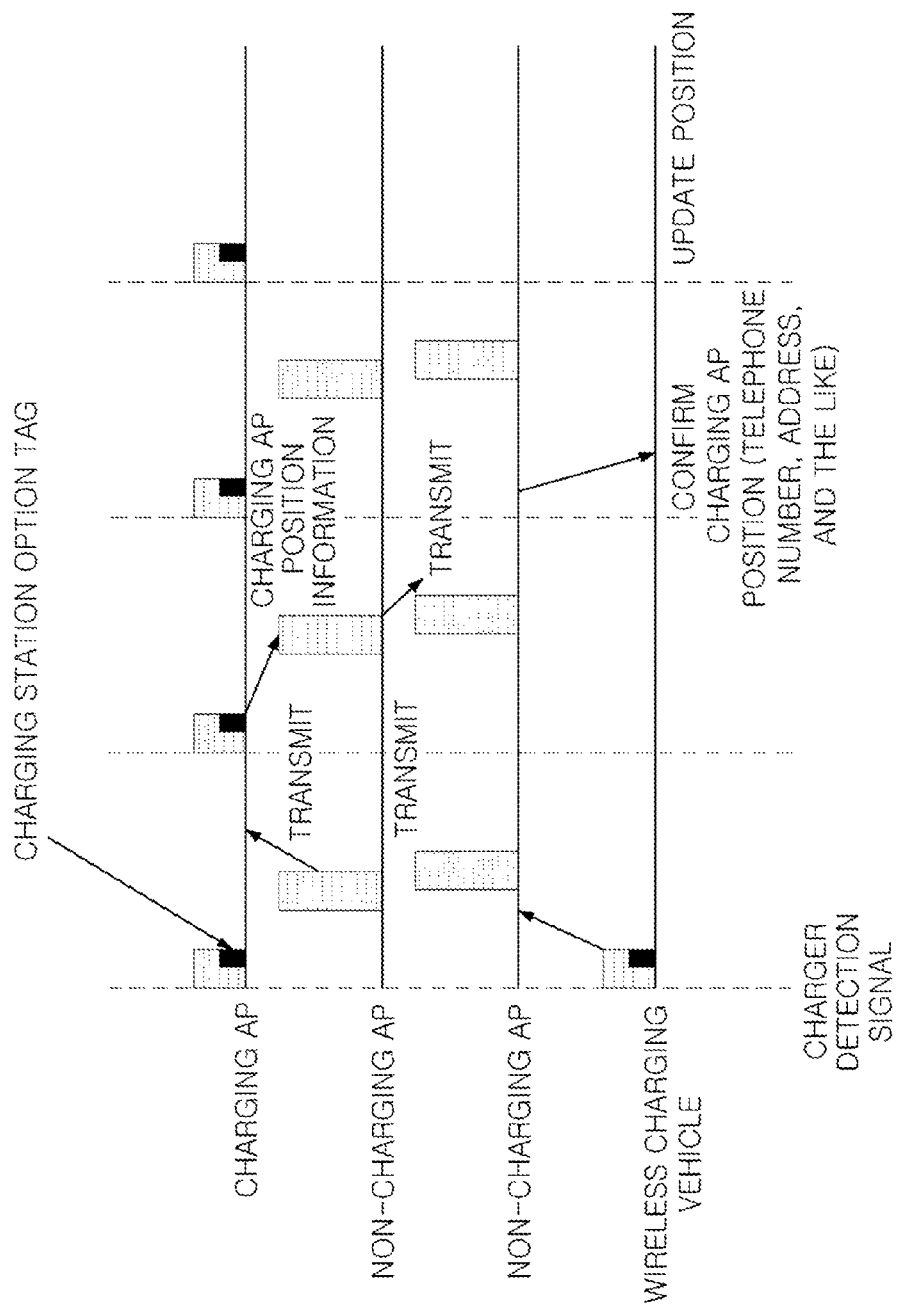

FIG. 1 is a diagram schematically illustrating a charging system according to embodiments of the present disclosure. FIGS. 4 and 5 are diagrams illustrating an example of finding out a charging station between a non-charging station and the charging station and the vehicle.

A charging system 100 according to embodiments of the present disclosure may include a charging vehicle (e.g., first station 10), a plurality of access points (e.g., second stations 20a, 20b, 30a, and 30b), and a server 50 connected to the plurality of access points 20a, 20b, 30a, and 30b. The access points 30a and 30b of the charger among the plurality of access points may each be connected to a plurality of transmitting coils 42, 44, 46, 62, 64, and 66.

FIG. 1 illustrates two charging vehicles 10a and 10b depending on the position of the charging vehicle 10. As an example, FIG. 1 illustrates that a network area which is a range in which a transmitting signal of the charging vehicle 10a is reached and a network area which is a range in which a transmitting signal of a first access point (AP1) 20a is reached overlap each other. As another example, FIG. 1 illustrates that a network area of the charging vehicle 10b overlaps a network area of the second access point (AP2) 20b and a network area of the third access point (AP3) 30a.

The charging vehicle 10 may determine whether a charger detection signal is transmitted to the access points based on a preset charging mode and a state of charge (SOC) of a battery included in the vehicle. The charging vehicle 10 may include a controller configured to determine whether the charger detection signal is transmitted based on the preset charging mode and the state of charge (SOC) of the battery which is included in the vehicle 10, a transmitter configured to transmit the charger detection signal to the plurality of access points 20a, 20b, 30a, and 30b depending on the on the determination on whether the charger detection signals are transmitted by the controller, and a receiver configured to receive a beacon signal from the plurality of access points 20a, 20b, 30a, and 30b depending on the determination on whether the charger detection signals are transmitted (each component is not illustrated).

The preset charging mode may be divided into, for example, an active mode and a passive mode and may be set in the charging vehicle 10 in advance by a driver or an automobile manufacturer. The active mode may be preset in consideration of the case in which the charging of the charging vehicle is urgent and is a charging mode which may more rapidly detect the charger by first transmitting the charger detection signal to the plurality of access points. The active mode may be set as a default of the charging mode.

On the other hand, the passive mode may be preset in consideration of the case in which the charging of the charging vehicle is not urgent. In this case, the charging vehicle may receive the beacon signal transmitted from the plurality of access points without transmitting the charger detection signal.

Further, when the SOC of the battery is less than a preset reference value, the charging vehicle 10 may transmit the charger detection signal to the access points independent of the preset charging mode like the above-mentioned active mode. That is, even when the preset charging mode is the active mode or the preset charging mode is the passive mode, the controller in the charging vehicle 10 may control (i.e., instruct) the transmitter to transmit the detection signal to the plurality of access points 20a, 20b, 30a, and 30b when the state of charge (SOC) of the battery is lower than the preset reference value.

Further, when the preset charging mode is the passive mode, and the SOC of the battery is higher than the preset reference value, the controller in the charging vehicle 10 may control (i.e., instruct) the transmitter to not transmit the charger detection signal and the receiver to receive the beacon signal from the plurality of access points. Even further, the charging vehicle 10 is preset as the passive mode, and the SOC of the battery is equal to or more than the preset reference value, the plurality of access points 20a, 20b, 30a, and 30b may receive the charger detection signal transmitted from the charging vehicle 10 or may transmit the beacon signal to the charging vehicle 10, based on the preset charging mode and the SOC of the battery.

When the plurality of beacon signals are received depending on the position of the charging vehicle 10, the charging vehicle 10 may select one of the received beacon signals based on whether the access point(s) transmitting the beacon signal is the access points 30a and 30b (i.e., the charger station) or the general access points 20a and 20b (i.e., the non-charging station). In detail, when the transmitting subject of the beacon signal is the access points 30a and 30b of the charger station, the charging vehicle 10 may select the charger station based on data included in the beacon signal.

Further, when the transmitting subject of the beacon signal is the general access points 20a and 20b of the non-charging station, the charging vehicle 10 may disregard the beacon signals transmitted from the general access points 20a and 20b.

The charging vehicle 10 may enter the optimal charger station based on the charger information stored in the beacon signals received from the access points 30a and 30b of the charger station, for example, a coil type and a maximum output capacity of the charger, a coil position (e.g., front, middle, back) based on a parking position, a charging type (e.g., wired, wireless, idle speed, rapid speed, magnetic resonance, magnetic induction, mixing), whether vehicle alignment is supported (e.g., automatically or manually), availability or not, cost, failure or not, and the like. On the other hand, even though the charging vehicle 10 is preset as the active mode or the passive mode, when the SOC of the battery is smaller than the preset reference value, the charging vehicle 10 may periodically transmit the charger detection signal (e.g., probe request signal message) to the plurality of access points 20a, 20b, 30a, and 30b. When receiving the charger detection signal transmitted from the charging vehicle 10, the access points 20a and 20b of the non-charging station among the plurality of access points 20a, 20b, 30a, and 30b may disregard the charger detection signal.

Referring to FIG. 4, even though the charger detection signal is received from the charging vehicle, it may be appreciated that the access point of the non-charging station does not respond to the charger detection signal, and the access point of the charger station transmits a signal responding to the charger detection signal to the charging vehicle 10. Further, the access points 20a and 20b of the non-charging station may transmit the received charger detection signal to other access points (hereinafter, "first access points") having a network area which overlaps their own network areas.

When there is the access point of the charging station among the first access points, the signal responding to the charger detection signal transmitted from the access points 20a and 20b of the non-charging station may again be transmitted to the access points 20a and 20b of the non-charging station. The access points 20a and 20b of the non-charging station may transmit the response signal transmitted from the access point of the charging station among the first access points to the charging vehicle 10. In contrast, when there is no access point of the charging station among the first access points, the charger detection signal may again be transmitted to other access points (hereinafter, "second access points") having the network area which overlaps the network area of the first access points.

When there is the access point of the charging station among the second access points, the signal responding to the charger detection signal transmitted from the first access point is transmitted to the first access point receiving the charger detection signal, the first access point transmits the received response signal to the access points 20a and 20b of the non-charging station, and the access points 20a and 20b of the non-charging station may transmit the received response signal to the charging vehicle 10.

In contrast to the arrangement illustrated in FIG. 1, even when all of the plurality of access points do not include the access point of the charger station, the charger detection signal is transmitted to other access points which are present in a signal arrival range of the access point of the non-charging station, thereby detecting the access point of the charger station. The algorithm is illustrated in FIG. 5. FIGS. 4 and 5 illustrate the wireless charging vehicle, but in addition to the wireless charging vehicle which may be wireless charged, a wired charging vehicle which may wirelessly communicate with the charger station is possible and FIGS. 4 and 5 illustrate only a vehicle depending on an example of the charging type of the charging vehicle and therefore are not limited thereto.

Referring to FIG. 5, when the charger detection signal from the charging vehicle 10 reaches the access point of the non-charging station, the charger detection signal is transmitted to access points of other non-charging station and consequently other non-charging stations also transmit the charger detection signal to the access point of the charger station. The access point of the charger station responding to the received charger detection signal transmits the response signal including the position of the charger station and other information in a reverse direction to a transmission path of the charger detection signal, such that the charging vehicle 10 may receive the response signal.

On the other hand, when receiving the charger detection signal transmitted from the charging vehicle 10, the access points 30a and 30b of the charger station among the plurality of access points 20a, 20b, 30a, and 30b may transmit the signal responding to the received charger detection signal to the charging vehicle 10. The response signal may include information, such as, for example, a position, a telephone number, an address, a coil type, and a maximum output capacity of the charger station which is a transmitting subject, a coil position (e.g., front, middle, back) based on a parking position, a charging type (e.g., wired, wireless, idle speed, rapid speed, magnetic resonance, magnetic induction, mixing), whether vehicle alignment is supported (e.g., automatically or manually), availability or not, cost, failure or not, and the like. Further, the charger detection signal transmitted from the charging vehicle 10 may also include information, such as, for example, the type of the transmitting coil equipped in the charging vehicle 10, the SOC of the battery, a maximum charging allowable capacity, and whether the vehicle alignment is supported.

Figure 2:
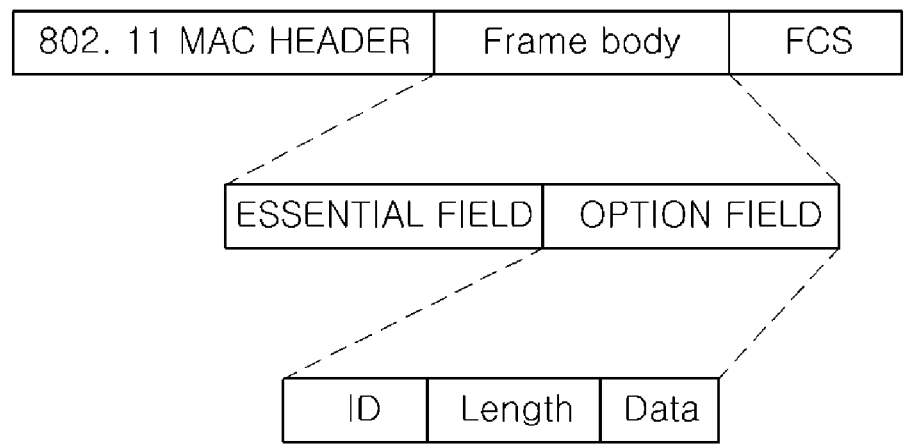
FIG. 2 is a diagram illustrating a data frame structure of a beacon signal transmitted from a plurality of access points to a vehicle side.

FIG. 2 is a diagram illustrating a data frame structure of a beacon signal transmitted from a plurality of access points to a vehicle side. The beacon signal may be configured of, for example, a wireless LAN 802.11 data frame. In the data frame structure, an option field of a body portion may include the charger related information as described above. That is, the option field of the beacon signal transmitted from the access point of the charger station includes the charger related information and thus the charging vehicle 10 may determine whether the received beacon signal is transmitted from the access point of the charger station or transmitted from the access point of the non-charging station.

Figure 3:
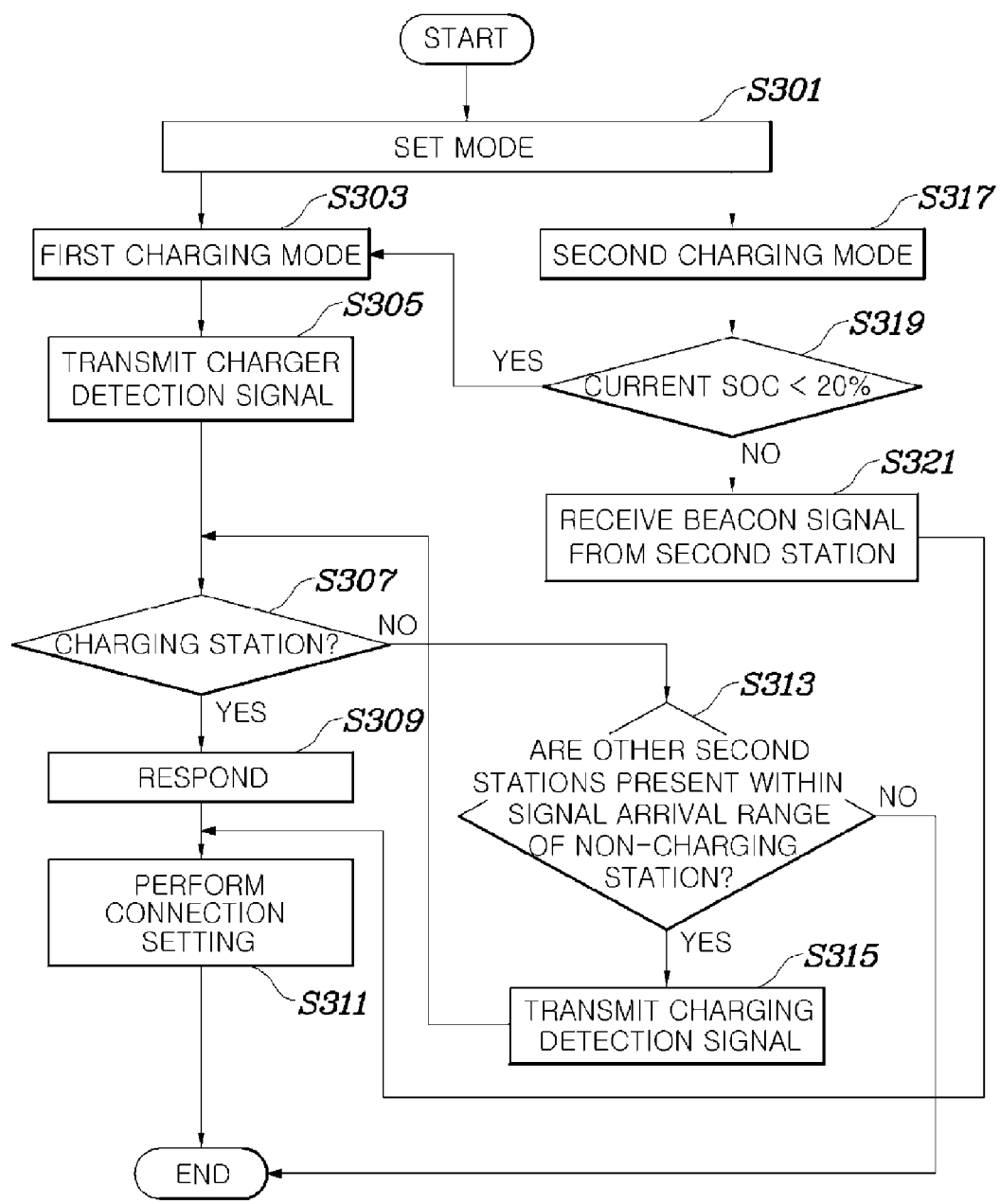
FIG. 3 is a flow chart illustrating a driving method of a charging system according to embodiments of the present disclosure.

FIG. 3 is a flow chart illustrating a driving method of a charging system according to embodiments of the present disclosure.

Referring to FIGS. 1 and 3, after a mode is preset (S301), when the preset charging mode is a first charging mode (i.e., active mode) (S303), the charging vehicle 10 transmits the charger detection signal to the plurality of access points which are present within the network area of the charging vehicle 10 (S305). Depending on whether the access point receiving the charger detection signal transmitted from the charging vehicle 10 is the access point of the charger station or the access point of the non-charging station (S307), in the case of the access point of the charger station, the signal responding to the charger detection signal transmitted from the charging vehicle 10 is transmitted to the charging vehicle 10 (S309). Next, a connection between the charging vehicle 10 and the charger station transmitting the response signal is made based on the received response signal and thus power transmission is performed (S311).

Depending on whether the access point receiving the charger detection signal transmitted from the charging vehicle 10 is the access point of the charger station or the access point of the non-charging station (S307), in the case of the access point of the non-charging station, the non-charging station may transmit the charging detection signal to other access points (S315) depending on whether other access points within the network area of the access point of the non-charging station are present (S313). Next, depending on whether the access point receiving the charging detection signal is the access point of the charger station or the access point of the non-charging station (S307), in the case of the access point of the charger station, the response signal is transmitted to the access point side receiving the charger detection signal and finally is transmitted to the charging vehicle, such that the charging may be performed between the access point transmitting the response signal and the charging vehicle 10. On the other hand, when the preset mode is a second charging mode (i.e., passive mode) (S317), when the SOC of the battery is detected (S319) and thus, the current SOC of the battery is lower than, for example, 20%, the charging may be performed by the same method as the case in which the first charging mode as described above is preset.

When the preset mode is the second charging mode (S317) and the SOC of the battery is equal to or more than, for example, 20%, the beacon signals may be received from the plurality of access points (S321). When the access point transmitting the beacon signal is the access point of the charger station, the charging may be performed between the corresponding access point and the charging vehicle (S311). That is, it may be determined whether the charger detection signal is transmitted to the access points based on the charging mode preset in the charging vehicle 10 and the SOC of the battery included in the charging vehicle 10. The access points may receive the transmitted charger detection signal depending on the determined result or the beacon signal may be transmitted to the charging vehicle 10.

When the preset charging mode is the first charging mode, or when the SOC of the battery is lower than the preset reference value and the preset charging mode is the second charging mode, the charging vehicle 10 may be determined to transmit the charger detection signal to the access points. On the other hand, when the preset charging mode is the second charging mode and the SOC of the battery is higher than the preset reference value, the charging vehicle determines to not transmit the charger detection signal, and thus, the access points may transmit the beacon signal to the charging vehicle. The charging vehicle may select and receive any one of the beacon signals transmitted from the access points depending on whether a kind of the plurality of access points is the access point of the charger station or the access point of the non-charging station. On the other hand, when the charging vehicle determines to transmit the charger detection signal, only the access point of the charging station among the plurality of access points receiving the charger detection signal may transmit the response signal to the charging vehicle 10.

When the charging vehicle determines to transmit the charger detection signal, the access point of the non-charging station of the plurality of access points receiving the charger detection signal may disregard the received charger detection signal, or may transmit the received charger detection signal to other access points which are present within the network area (i.e., signal arrival range).

As described above, according to embodiments of the present disclosure, when the vehicle enters the network area of other access points, and the corresponding access point is not the access point of the charger, it is possible to determine the optimal access point of the charger. Further, a charging process can be performed by changing the mode depending on the SOC of the battery included in the vehicle. Further, the access point of the charger can be rapidly detected, even when the plurality of access points are in the network area of the vehicle.

Although the present disclosure has been described with reference to embodiments shown in the accompanying drawings, they are only examples. It will be appreciated by those skilled in the art that various modifications and equivalent other embodiments are possible from the present disclosure. Accordingly, an actual technical protection scope of the present disclosure is to be defined by the following claims.

What is claimed is:

1. A charging control method performed by a vehicle including a battery connected to at least one charger of charging stations through at least one access point, comprising:
    determining a state of charge of the battery based on a preset reference value when the vehicle enters a network area serviced by the ate least on access points;
    transmitting a charger detection signal to the at least one access point if the state of charge of the battery is lower than the preset reference value;
    receiving one or more beacon signals from the at least one access point if the state of charge of the battery is higher than or equal to the preset reference value; and
    selecting a charger for charging the battery of the vehicle based on the responses to the charger detection signal received from the at least one charger or the beacon signals.

2. The charging control method of claim 1, further comprising:
    receiving at least one response signal responding to the charger detection signal from at least one access point; and
    wherein selecting of a charger for charging the battery of the vehicle includes selecting the charger based on information included in the response signals.

3. The charging control method of claim 2, wherein the information included in the response signal includes information regarding at least one selected from the group consisting of: a location, a telephone number, an address, a coil type, a maximum output capacity, a coil position, and a charging type of each charger.

4. The charging control method of claim 1, wherein the charger detection signal includes information regarding at least one selected from the group consisting of: a transmitting coil equipped in the vehicle, the state of charge of the battery, a maximum charging allowable capacity, and whether a vehicle alignment is supported.

5. The charging control method of claim 2, wherein the receiving of at least one response signal responding to the charger detection signal from at least one access point includes receiving at least one response signal through at least one non-charging access point.

6. The charging control method of claim 1, wherein the selecting of a charger for charging the battery of the vehicle includes selecting one beacon signal among the at least one beacon signals based on charger information included in the at least one beacon signal.

7. The charging control method of claim 6, wherein the charger information includes information regarding at least one selected from the group consisting of: a coil type, a maximum output capacity, a coil position, a charging type of the charger, and whether vehicle alignment is supported.

8. The charging control method of claim 1, wherein the at least one access point includes at least one charging access point connected to one or more chargers or charging stations and at least one non-charging access point.

9. A vehicle including a battery connected to at least one charger of charging stations though at least one access point, comprising:
   a controller configured to determine a state of charge of the battery based on a preset reference value when the vehicle enter a network area serviced by the at least one access point and determine whether to transmit a charger detection signal to the at least one access point or to receive one or more beacon signals format least one access point;
   a transmitter configured to transmit the charger detection signals to the at least one access point when the state of charge of the battery is lower than the preset reference value; and
   a receiver configured to receive one or more beacon signals from the at least one access point if the state of charge of the battery is higher than or equal to the preset reference value.

10. The vehicle of claim 9, wherein the controller selects a charger for charging the battery of the vehicle based on at least one response signal responding to the charger detection signal received from the at least one charger.

11. The charging vehicle of claim 10, wherein the receiver receives the at least one response signal through at least one access point.

12. The vehicle of claim 9, wherein the at least one access point includes at least one charging access point connected to one or more chargers or charging stations and at least one non-charging access point.

13. The vehicle of claim 9, wherein the controller selects a charger based on information included in the beacon signals received through at least one access point.

14. The vehicle of claim 13, wherein the controller selects a charger by selecting one beacon signal among the at least one beacon signal based on charger information included in the beacon signals.

15. The vehicle of claim 14, wherein the charger information includes information regarding at least one selected from the group consisting of: a coil type, a maximum output capacity, a coil position, a charging type of the charger, and whether vehicle alignment is supported.

16. The vehicle of claim 9, wherein the charger detection signal includes information regarding at least one selected from the group consisting of: a type of a transmitting coil equipped in the vehicle, the state of charge of the battery, a maximum charging allowable capacity, and whether a vehicle alignment is supported.

17. A controlling method for a charging station including at least one access point connected to at least one charger, the charging station communicating with a plurality of vehicles through at least one access point, comprising:
   transmitting a beacon signal including charger information about the at least one charger;
   receiving a charger detection signal from a vehicle, the charger detection signal including a state of charge of a battery included in the vehicle; and
   transmitting a response signal responding to the charger detection signal through the at least one access point,
   wherein the response signal includes information about at least one selected from the group consisting of: a location, a maximum output capacity, a charging type, and a coil type of charger, and
   wherein the charger detection signal is received from the vehicle when the state of charge of the battery is lower than a preset reference value.

18. The controlling method of claim 17, wherein the charger detection signal further includes information regarding at least one selected from the group consisting of: a type of a transmitting coil equipped in the vehicle, a maximum charging allowable capacity, and whether a vehicle alignment is supported.

19. The controlling method of claim 17, wherein the at least one access point includes at least one charging access point connected to one or more chargers or charging stations and at least one non-charging access point.

20. The controlling method of claim 17, wherein:
   the response signal further includes information regarding at least one selected from the group consisting of: a coil position and whether vehicle alignment is supported.

* * * * *